Feb. 26, 1952      E. J. KOOP      2,587,487
EARTH SCOOP

Filed Jan. 20, 1947      2 SHEETS—SHEET 2

INVENTOR.
Ernest J. Koop.
BY
Wilfred Lawson
Attorney

Patented Feb. 26, 1952

2,587,487

UNITED STATES PATENT OFFICE 2,587,487

EARTH SCOOP

Ernest J. Koop, Shafter, Calif.

Application January 20, 1947, Serial No. 723,129

4 Claims. (Cl. 37—140)

The present invention relates to a dirt scoop and more particularly to a dirt scoop wherein the scoop members themselves are constructed to function as and in place of wheels.

It is an object of the present invention to provide a novel dirt scoop adapted for use as a check machine to prevent excess drainage after a border or ridger machine has prepared land for irrigation.

One object of the present invention is to provide a novel trip arrangement, whereby when the trip is released the arcuate scoop plates serve as wheels and whereby when the trip is in locked position, the plates are locked against rotation, so as to drag over the ground and serve as a dirt scoop.

Another object is to provide a shock absorber arrangement adapted to absorb the initial shock imparted by the scoop when the trip is moved to latching position to lock the scoop blades against rotation.

The above and other objects and features of the invention will be apparent from the following description of the illustrative embodiment shown in the accompanying drawing, in which.

Figure 1:
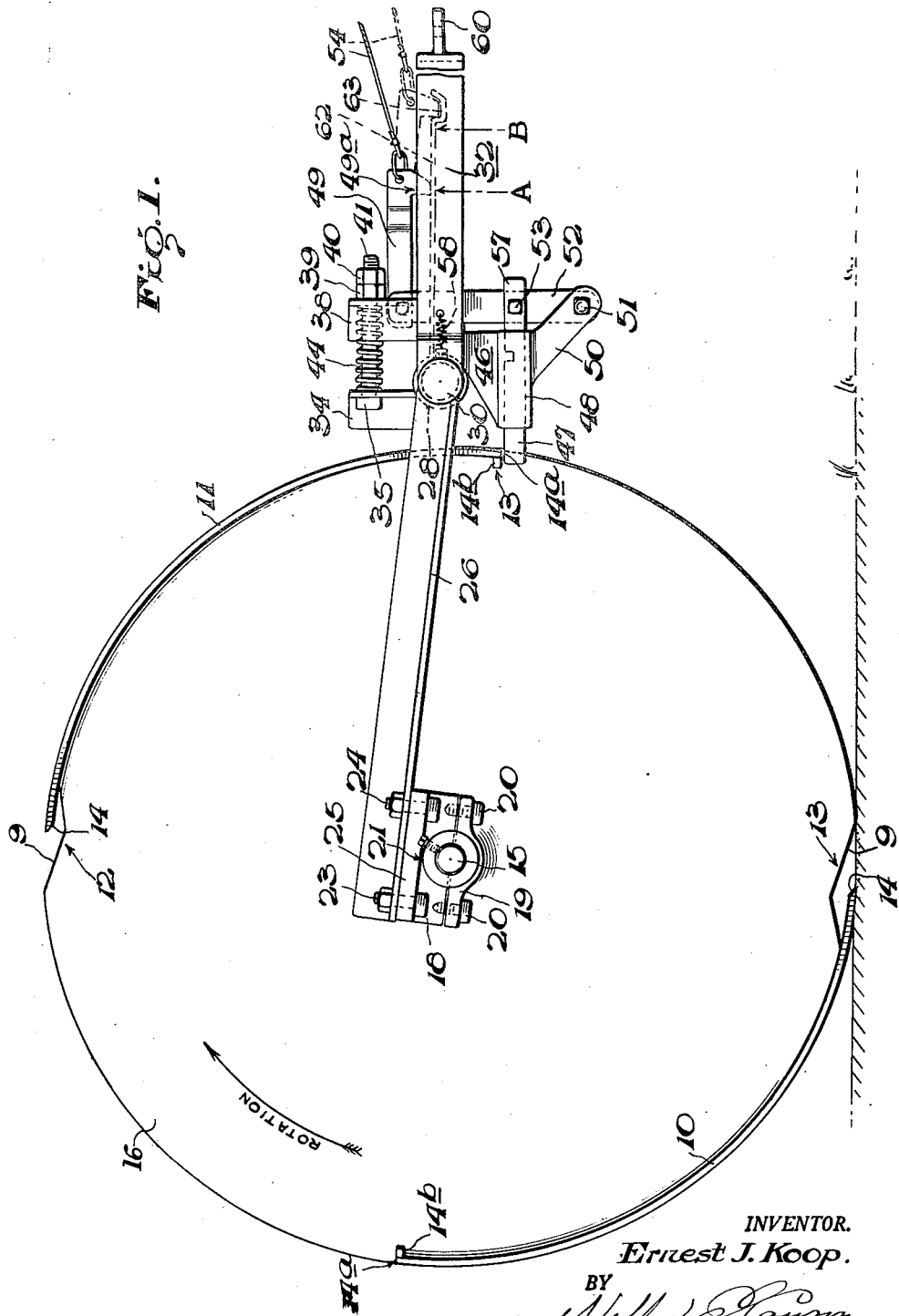
Figure 1 is a side view in elevation of a machine constructed in accordance with the present invention.

Referring more particularly to the drawings it will be seen that the machine comprises an axle 15 upon which is secured, substantially midway between its ends and concentric therewith, the circular plate or disk 16.

Secured to and extending partway around the periphery of this disk 16 are the two arcuate scoop plates 10 and 11. These plates are in diametrically opposite positions on the disk and each is shown as defining approximately a quarter of a circle. Thus it will be seen that each longitudinal edge of each plate is diametrically opposite a corresponding longitudinal edge of the other plate.

One longitudinal edge of each arcuate scoop plate is sharpened to form a blade as indicated at 14 and in the operation of the machine, as hereinafter set forth, when the scoop is stationary or, in other words, is not rotating, one of these edges 14 will be directly forwardly or in the direction of travel and becomes the advancing edge of the scoop to dig into the earth. At the opposite or trailing edge of each scoop plate, designated 14a, there is fixed to the inner side of the plate and at one side of the central disk 16, a stop lug 14b.

The disk 16 is provided at diametrically opposite points with the relatively deep gaps 12 and 13. Each of these gaps extends across the cutting edge 14 of a scoop plate thereby providing clearance space to permit the cutting or knife edge to easily penetrate the earth.

The axle 15 has split journal bearings mounted on each end thereof comprising upper and lower sections 18 and 19 clamped together by bolts 20. The upper section 18 has a flat surface 21 with bolt head retaining sockets therein for bolts 23 and 24. The threaded shanks of these bolts are adapted to thread into threaded openings in draft bars 26 and 27 one of which is thus mounted on each end of the axle, so as to frame the scoop plates or blades, and a separate block 25, if desired, may be interposed between the surface 21 and said bars.

The angle bars 26 and 27 extend forward beyond the leading surfaces of the scoop blades and their forward ends are welded to a hollow draft sleeve pipe 28 secured across their respective ends. The sleeve 28 has extending therethrough a shaft 30, to each end of which is welded an end of a V-shaped draft yoke 32. With this arrangement the shaft 30 may turn in the sleeve 28, for the reasons hereinafter explained.

Each angle bar 26 and 27 carries at its forward end an upstanding post 34 with an opening for a relatively long bolt 35, which extends forward over a part of the draft yoke 32. The draft yoke 32 carries, in alignment with the post 34, an apertured upstanding bracket 38 through which the forward end of the adjacent bolt 35 extends. The bolts extend between the brackets 38 and the posts 34 and are held in place by nuts 39 and 40 on the threaded end 41 of each bolt. The head ends of the bolts 35 are preferably fixed to the posts 34, while the bolt shanks are slidable in the bracket apertures. Around the shank of each bolt 35 is a shock absorber spring 44, which serves to yieldably resist the pivoting of sleeve 28 and draft bars 26 on the shaft 30, which pivoting action is caused primarily by the resistance or weight of the dirt being scooped up by the plates when they are locked against rotation.

Figure 2:
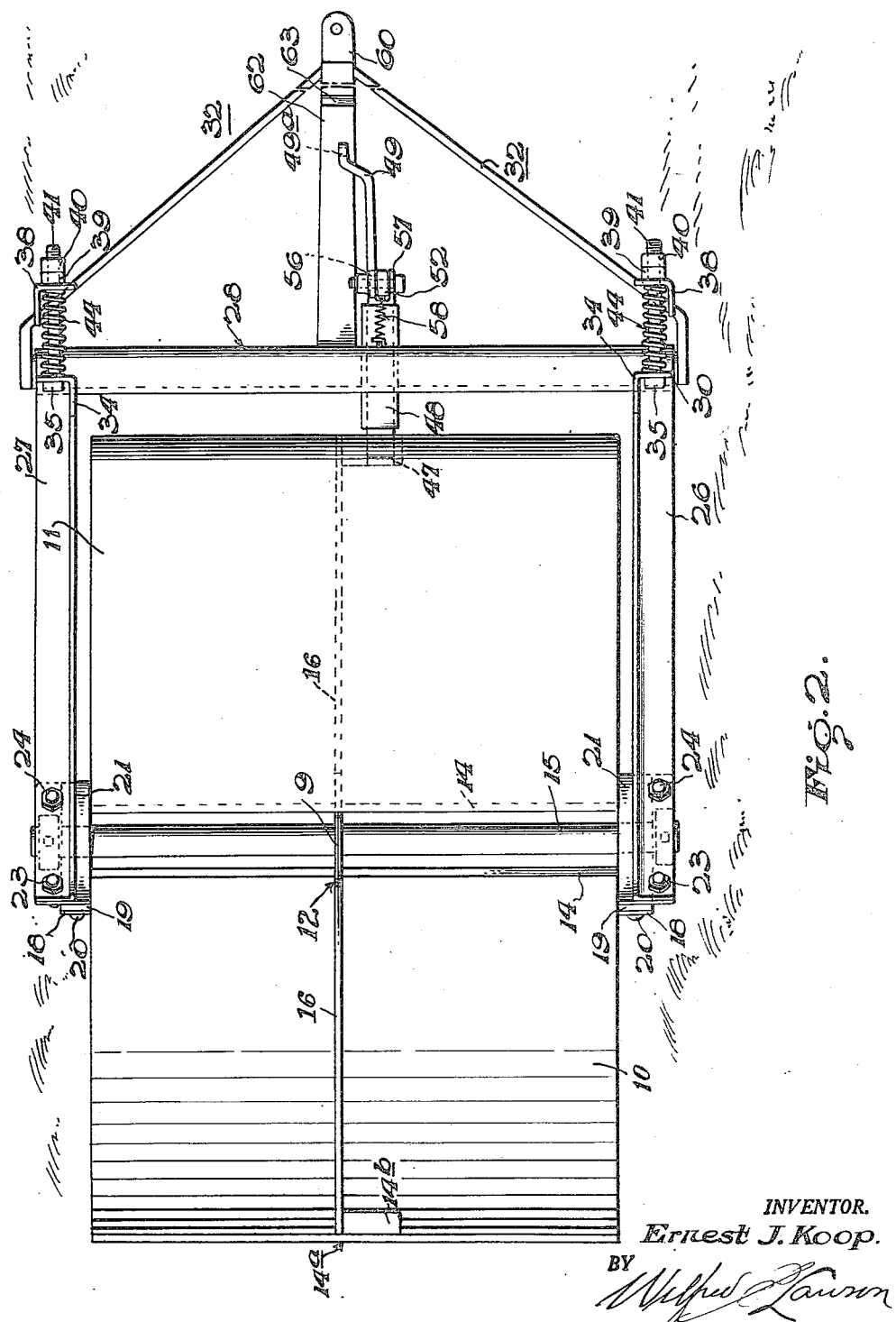
Figure 2 is a top plan view of the same.

Novel means to provide for locking the scoop plates against rotation, comprises a hanging bracket 46 secured to the underside of the mid-section of the sleeve 28 and a sliding lock bolt 47 mounted in a guide cylinder 48 carried by the bracket and extending rearwardly toward the center of the scoop plates 10 and 11. This bolt, when projected rearwardly, has its rear end in the circular path of travel of the edge 14a and the stop lug 14b adjacent thereto, to engage the latter and hold the scoop plates from turning. The actuator means for the bolt 47 comprises an angular disposed flat lug 50 fixed to the bottom of the cylinder 48. The fixed lug 50 has an opening in its free end for a pin 51, which serves as a pivot for one end of a link 52. The link 52 is connected above the pin 51 to the end of bolt 47 by a bolt 53 and the link extends upward for pivotal connection to one end of a trip link 49 which at its other and forward end is formed to provide an offset hook 49a formed with an opening for connection with an operating cable or chain 54. As shown, the end of the bolt 47 is preferably bifurcated to form fingers 56 and 57 and the bolt 53 extends across between the same, as shown in Figure 2. Connected to one side of this link 52 is a return spring 58. This spring has one end inserted in an opening on the link 52 and its other end connected to the sleeve 28, for example.

At the apex of the draft yoke 32 is mounted a draft link 60 with an opening to receive a transverse draw bar, not shown, connected to a ridging machine. For example, with the use of a draw bar two units such as shown can be coupled to each end of the draw bar, or they can be drawn separately as desired.

In the operation of the machine the lock bolt 47 extends across beneath a stop lug 14b to hold the scoop against rotation, as shown in Figure 1, when the machine is being drawn forwardly. Thus the cutting edge 14 is engaged against the ground and earth will be scooped up into the concave inner side of the scoop plate 10. When it is desired to release the scooped up earth to form a dam, the link 49 is pulled forwardly by means of the cable 54. In this action the hook 49a slides along the top of the relatively long spring steel bar 62 which is secured at its rear end to the sleeve 28 as shown in Figure 2. The forward end of this spring bar is unattached and adjacent to the forward end it is provided with a transverse keeper recess 63. Thus the link 49 may be made to move from the position A, in which position the lock bolt 47 is in scoop securing position, to position B which is just short of the postion where the hook 49a will engage in the recess 63. However, such movement of the link 49 is sufficient to oscillate the link 52 so as to retract the bolt 47 to free it from engagement with the edge 14a and stop lug 14b of the uppermost scoop plate 11. To allow for the free actuation of bolt 47, the sleeve 48 is made of a size to provide a loose fit of these parts. When the scoop is so released the disk 16 upon the periphery of which the plates 10 and 11 are carried, together with the two plates 10, 11 becomes a wheel whereby the entire structure mounted on the axle 15 rotates in the direction indicated by the arrow in Figure 1. The end of the lock bolt 47 then rides over the curved outer surface of the scoop plate 11 until it passes and snaps off of the sharpened edge 14 of the scoop plate 11 whereupon it will be in position to be engaged by the edge 14a and stop lug 14b of the scoop plate 10. It will be understood, of course, that when the cable 54 is pulled so as to disengage the bolt 47 from the adjacent plate the cable will be released as soon as the disengagement is effected so that the spring 58 which has been placed under tension by this action, will tend to force the bolt 47 rearwardly so that when the bolt rides off of the sharpened edge of the engaged scoop plate it will be projected into the proper position for engagement with the edge and stop lug of the next plate as described.

During the release of the scoop and the performance of the half revolution of the scoop plates and disk it will be understood that the earth collected by the lowermost plate will be dumped and the blade edge or cutting edge of the next plate will be moved into working position.

When it becomes necessary to fix the trip assembly in inoperative position so that the scoop plates and disk may continue to rotate, as, for example, in moving the machine from one location to another, the link 49 is drawn forwardly beyond position B so as to cause the hook 49a to become engaged in the recess 63. The tendency of the spring plate or bar 62 to move upwardly will thus effect the coupling of the link with the spring and the parts will be held with the bolt 47 in inoperative position.

During the operation of the machine when one scoop plate is dumping and the other one is moving around into position, and when the edge 14a of the dumping scoop plate comes into contact with the lock bolt 47, considerable shock will result. This shock is taken up by the compression spring 44, as will be readily apparent, since it will be seen that there will be a tendency toward relative turning of the sleeve 28 and the shaft 30, thus moving the post 34 forwardly toward the adjacent brackets with a resultant compression of the springs 44.

Thus I have provided novel improvements in machines for use in making earthen dams on each side of a ridge or border for irrigating open land, groves or orchards, whereby such dams can be deposited at will, by pulling a novel trip arrangement which releases the dirt gathering scoop plates. Also, in cooperation with my novel trip arrangement I have provided shock absorbing means with a draft yoke adapted to have a pivotal movement when the dirt scoop plates are locked against rotation by the trip.

While only one embodiment of the invention has been illustrated and described, various changes and modifications, which will now appear to those skilled in the art, may be made without departing from the scope of the invention. Reference is therefore to be had to the appended claims for a definition of the limits of the invention.

I claim:

1. A dirt scoop for land ridged for irrigation comprising an axle, a disc mounted on the axle for rotation, arcuate scoop plates welded to the peripheral edge of said disc with their ends spaced apart in a substantially circumferential line, said plates having knife-like leading edges and blunt trailing edges and being normally adapted to rotate with said disc on the axis of said axle, draft means journalled to said axle, and trip means carried by said draft means and including a reciprocable bolt engageable and disengageable with said blunt edges of the plates, to thereby lock the same against rotation to serve as dirt scoops.

2. The device as described in claim 1, wherein said draft means comprises side bars each journalled at one end to an end of said axle, a sleeve connected across and to the other ends of said side bars, a shaft extending through said sleeve, a draft yoke integrally connected with the ends of said shaft, to thereby provide for pivotal movement of said draft yoke relative to the side bars, and yieldable means connected between the yoke and said side bars to cushion said pivotal movement.

3. A dirt scoop for land ridged for irrigation comprising an axle, a disc mounted on the axle for rotation, arcuate scoop members welded to the peripheral edge of said disc with their ends spaced apart in a substantially circumferential line, said members having knife-like leading edges and blunt trailing edges and being normally adapted to rotate with said disc and axle, draft means journalled to said axle comprising side bars, bearing members adapted to pivot an end of each of said bars on one end of said axle, upstanding posts on the opposite end of each side bar, a bolt supported on each post, a yoke pivotally coupled with the said opposite ends of said side bars, brackets carried by said yoke and each having an opening slidably receiving the bolt supported by an adjacent post, a cushion spring means on said bolts between the adjacent posts and brackets, means to releasably lock said scoop members against rotation, comprising a guide carried by the pivotal coupling between the yoke and the side bars, an elongated plate having an end secured to said coupling, said plate having a keeper recess therein, a bolt reciprocably mounted in said guide, a rock link pivoted to said guide at one end and to the end of said bolt, a link pivoted to the other end of said rock link, said link having an offset end terminating in a hook adapted to engage into the recess in the said elongated plate, and operating means connected to said offset end of the link for effecting movement of the link to impart movement to the said bolt.

4. In a unit for scooping dirt as set forth, an axle, a disk thereon to revolve about the axis thereof, arcuate scoop plates carried by the disk to revolve therewith as a wheel, said arcuate scoop plates being concentric with the axle and having a leading knife edge and a trailing blunt edge, a draft yoke, means coupling the yoke with the axle ends including a pivot across the front of the unit having its axis paralleling the axle, a trip mechanism supported on said yoke and adapted to lock said scoop members against rotation, means for releasing said trip mechanism, shock absorbing means operatively connected between the yoke and said coupling means for cushioning the pivotal action of said yoke and coupling means when said trip mechanism operates to lock said scoop members against rotation, said trip mechanism comprising a guide sleeve supported from the underside of said draft yoke, a reciprocable bolt therein, and means connected to one end of said bolt for effecting the engagement and disengagement of the other end of said bolt with the blunt edge of one of said scoop members.

ERNEST J. KOOP.

REFERENCES CITED

The following references are of record in the file of this patent:

UNITED STATES PATENTS

| Number | Name | Date |
| --- | --- | --- |
| 629,452 | Lovejoy | July 25, 1899 |
| 1,554,523 | Reynolds | Sept. 22, 1925 |
| 1,801,322 | Armington | Apr. 21, 1931 |
| 1,893,131 | Council et al. | Jan. 3, 1933 |
| 1,974,717 | Le Bleu | Sept. 25, 1934 |
| 2,094,515 | Abbe | Sept. 28, 1937 |
| 2,099,435 | Davenport | Nov. 16, 1937 |
| 2,152,700 | Le Bleu | Apr. 4, 1939 |
| 2,293,636 | Berner et al. | Aug. 18, 1942 |